Sept. 26, 1944.   L. C. MORRIS   2,358,819
FLUID REGULATOR
Filed Sept. 10, 1941

Inventor
Louis C. Morris
By Lyon & Lyon
Attorneys

Patented Sept. 26, 1944

2,358,819

UNITED STATES PATENT OFFICE 2,358,819

FLUID REGULATOR

Louis C. Morris, Los Angeles, Calif., assignor to Payne Furnace & Supply Company, Inc., Beverly Hills, Calif., a corporation of California Application September 10, 1941, Serial No. 410,290

6 Claims. (Cl. 50—21)

This invention relates to fluid pressure regulators such as are employed in gas consumers' lines, to supply gas to gas appliances at a predetermined pressure, and in sufficient quantity to supply all the gas required by the appliance, or appliances, that are in use by the consumer.

This regulator is of a type in which the degree of opening of the valve supplying the gas to the consumer, is controlled automatically through the agency of pressure in the pressure chamber controlled by the velocity of flow of the gas through the valve passage.

One of the objects of the invention is to produce a regulator of this kind, which will have a relatively great range of usefulness; in other words, that can operate efficiently with relatively low velocities of flow of the gas, and also efficiently with relatively high velocities of flow of the gas through the valve passage.

A further object of the invention is to construct the valve in such a way that it will automatically adapt itself to the working conditions of the regulator.

In regulator valves of this type, a pressure chamber is provided in which the pressure controlled member such as a diaphragm, is mounted for movement, and this pressure controlled member or diaphragm is attached to the stem of the valve. When the velocity of flow of the gas through the gas passage of the valve casing becomes higher, the gas under pressure in the pressure chamber, becomes partially educted, and this causes a movement of the pressure controlled member and increases the effective opening of the valve. In this way, the valve automatically passes more gas to the appliances when more openings are used at the appliances through which the gas is escaping.

A further object of the invention is to provide a special construction at the valve head or valve closure, involving the use of an auxiliary head or collar, which will lie on the valve seat if the regulator is operating with relatively low velocities of flow, but which will drop down onto the regular valve head and virtually become a part of the same when the regulator is operating under a relatively high velocity of flow.

Further objects of the invention will appear hereinafter.

The invention consists in the novel parts and combination of parts to be described hereinafter, all of which contribute to produce an efficient fluid regulator.

A preferred embodiment of the invention is described in the following specification, while the broad scope of the invention is pointed out in the appended claims.

Figure 1:
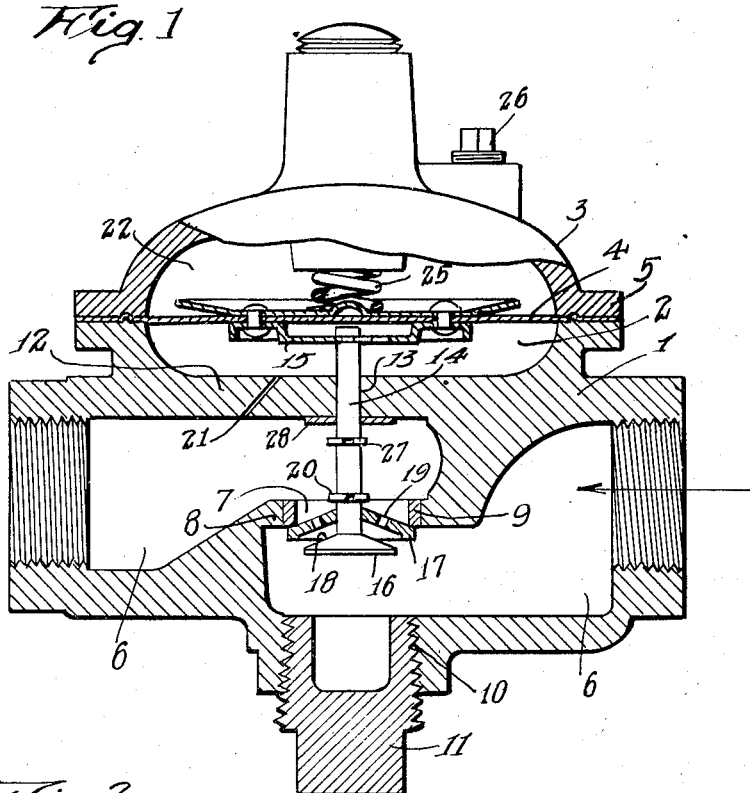
Fig. 1 is a longitudinal vertical section through the lower portion of the regulator valve casing, the upper portion of the view showing the casing in elevation. This view indicates the parts of the valve in the relation which they have when the regulator is operating under a relatively slow velocity of flow.

In practicing the invention, the valve casing 1 is provided, associated with which a pressure chamber 2 is formed which, in the present instance, is formed in the casing under a bonnet 3. In the pressure chamber a pressure controlled member is employed to control the position of the valve with respect to its seat, and in the present instance, a diaphragm 4 is employed, the edges of which are clamped between flanges 5 on the casing and the bonnet.

A fluid, such as gas, flows through this regulator from the right to the left as indicated by the arrow, passing through the gas passage 6 that brings the gas to the outer side of the valve closures so as to permit it to pass up through a valve opening 7 in a horizontal web 8 in the casing. At the opening 7 a bushing 9 may be provided, to operate as a valve seat. Access is had to the web 8 to bore out the opening 7 and place the seat 9 in position, through an access opening 10 in the bottom of the casing, which is afterwards closed by a threaded plug 11.

The wall 12 that separates the gas passage 6 from the pressure chamber 2, is provided with a guide opening 13 for the valve stem 14, the upper end of the valve stem being secured by any suitable anchorage means such as an anchor plate 15, to the under side of the diaphragm 4. The lower end of the stem 14 is provided with a valve head 16, which may be formed as an integral part of the stem, or it may be constructed as a separate piece rigidly secured to the stem.

On the stem 14 adjacent the head 16, I provide a valve closure 17 which is preferably in the form of a conical disc, that is to say, it is preferably formed with a conical face on its upper side, and has a contour on its under side to enable it to fit against the upper face 18 of the valve head, which is also preferably conical.

When the regulator is operating under a low flow velocity, this valve closure 17 lies against the seat, and at this time the gas passes through its perforated area, that is to say, through a plurality of perforations 19 formed in the conical disc 17. At this time, the valve head 16 would be located at a slight distance below the under side of the valve closure or disc 17, and will move up or down as controlled by the diaphragm to cover the perforations more or less, and restrict the flow of gas to, and through, the perforations 19.

Figure 2:
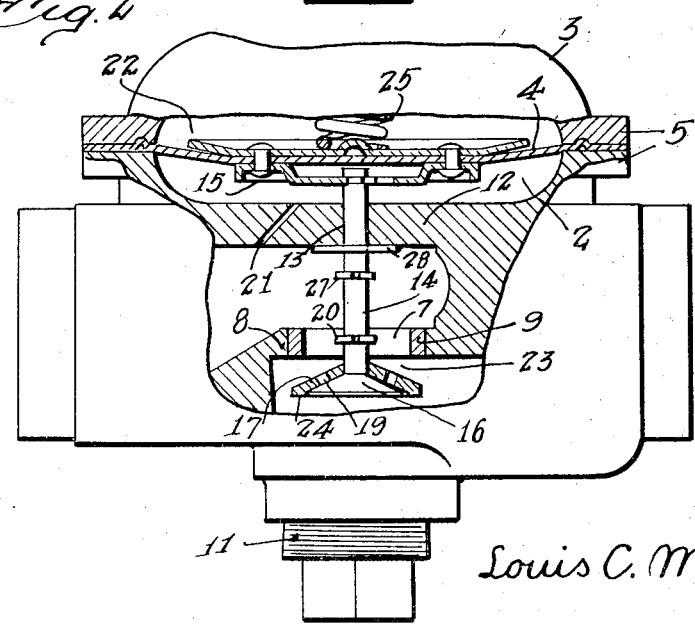
Fig. 2 is a side elevation and partial section showing the valve and its relation to the valve seat when the regulator is operating under a relatively high velocity of flow.

Above the valve closure 17 the stem is provided with a shoulder or collar 20, and if the velocity of flow of gas becomes too great to have the regulator operate efficiently, with valve closure 17 seated, then the gas flowing through the passage 6 will effect an eduction of gas from the pressure chamber 2 through an eduction port 21 that leads into the passage 6 from the pressure chamber, and preferably inclines "down stream" with respect to the direction of flow so that the gas passing the lower end of this port will cause a slight reduction in pressure in the eduction port if the velocity of flow increases. When this velocty becomes great enough, the pressure in the pressure chamber 2 will become so reduced that the air pressure or regulating pressure in the chamber 22 above the diaphragm, will push the diaphragm down to such an extent that the shoulder or collar 20 will engage the upper side of the closure 17 and push it down away from the seat 9, causing it to descend onto the head 16 on which it will rest as indicated in Fig. 2. This will immediately give a greatly increased effective area of flow at the zone or point 23 indicated in Fig. 2 between the valve seat 9 and the upper face of the perforated member 17. In this position, of course, the perforations 19 perform no function, and the valve head 16 with the disc 17 lying on it, will operate in unison as an ordinary valve head of larger diameter, and having its weight increased by the weight of the disc 17, thereby adapting the valve to function effectively at a higher velocity of flow.

The valve closure 17 is preferably recessed on its under face so as to fit the head 16, and so that when in position the periphery of the valve closure 17 will project considerably beyond the periphery of the head 16 and present an annular face 24 beyond the margin of the head 16. This facilitates the automatic return of the valve to the condition indicated in Fig. 1, if the velocity of flow should drop to the limit at which the valve is designed to operate on a low velocity. When this occurs, the upper face of the disc 17 will approach so close to the valve seat 9 that the unbalanced pressure on the annular face 24 will cause it to move up through the short remaining distance and seat itself on the seat as indicated in Fig. 1. An inlet opening will then be formed between the conical face 18 of the valve head 16 and the under side of the conical disc 17, and the diaphragm 4 will effect any necessary movement at the valve head 16 to enable the regulator to commence functioning properly on the low velocity flow.

The upper side of the diaphragm 4 may be provided with the usual light coil spring 25, that insures that there will always be an opening for flow of gas through the valve.

The bonnet 3 may be provided with an opening to the atmosphere, closed by a threaded plug 26. If the regulator is to be used with special controls such as pneumatic controls, this plug 26 can be removed, and connection can be made to this pneumatic control apparatus, that will automatically control the pressure in the chamber 22. Under ordinary circumstances, however, this chamber 22 will communicate directly to the atmosphere, either through a regulated vent at the plug 26 or, if desired, through a bleeder opening or port made directly through the wall of the bonnet.

If desired, means may be provided on the stem 14 for sealing the pressure chamber 2 from velocity flow pressure through guide opening 13. This means may take the form of a washer 28 on valve stem 14. The velocity flow pressure into passage 6 under normal operating conditions, holding washer 28 against wall 12, sealing guide opening 13, and assuring the regulating pressure in chamber 2, will be through eduction port 21. A small collar 27 similar to collar 20 may be provided on valve stem 14 to limit the movement of washer 28 on valve stem 14.

A regulator embodying these features described above, operates sensitively at low gas pressure and low velocities but, of course, will have a very high gas-carrying capacity when operating under the high velocity flows.

Many other embodiments of the invention may be resorted to without departing from the spirit of the invention.

What I claim is:

1. In a regulator valve, for regulating the flow of fluid to an appliance consuming the fluid, the combination of a casing having a fluid passage and a valve opening through the same with a valve-seat, through which the fluid flows upwardly, a pressure-chamber associated with said casing, pressure-controlled means therein, with an eduction port located at a point removed from the valve, and leading from the said pressure chamber into the said fluid passage, and constituting the sole means of communication between the same, a valve stem connected to the pressure-controlled means for movement thereby toward or from the valve-seat and guided to move within the said passage, a valve closure on the stem comprising a perforated closure member below the seat, and having a plurality of perforations, and an imperforate head below the same, said perforated member and said stem being capable of relative movement with respect to each other, toward and from the valve-seat and so that the imperforate head can move toward, and cover more or less, the perforations of the perforate member; all of said parts cooperating to enable the perforated member to lie seated against the valve-seat when the regulator valve is operating under relatively low velocity of flow during which the position of the imperforate head relative to the perforated member controls the flow of fluid through the perforations; said perforated closure member operating, when regulating flow at a relatively higher velocity, to lie substantially against the adjacent side of the head and move to and fro in unison with the head.

2. In a regulator valve, for regulating the flow of fluid to an appliance consuming the fluid, the combination of a casing having a fluid passage and a valve opening through the same with a valve-seat, through which the fluid flows upwardly, a pressure-chamber associated with the casing, with an eduction port from the pressure-chamber into the fluid passage, and constituting the sole means of communication between the pressure chamber and the fluid passage, pressure-controlled means within the pressure-chamber, a valve stem connected to the pressure-controlled means for movement thereby toward or from the valve seat and guided to move within the said passage, a valve closure on the stem comprising a perforated head below the seat, and having a plurality of perforations, and an imperforate head below the same, said perforated head and said stem being capable of relative movement with respect to each other, toward and from the valve-seat and so that the imperforate head can approach and cover the perforations more or less; all of said parts cooperating to enable the perforated head to lie seated against the valve-seat when the regulator valve is operating under relatively low velocity of flow, during which the position of the imperforate head relative to the perforated head controls the flow of fluid through the perforations; said perforated head operating, when regulating flow at a relatively higher velocity, to lie substantially against the adjacent side of the head and move to and fro in unison with the head.

3. In a regulator valve, for regulating the flow of fluid to an appliance consuming the fluid, the combination of a casing having a fluid passage and a valve opening through the same with a valve-seat, through which the fluid flows upwardly, a pressure-chamber associated with said casing, with an eduction port located at a point removed from the valve opening, and leading from the said pressure chamber into the said fluid passage, and constituting the sole means of communication between the same, pressure-controlled means therein, a valve stem connected to the pressure-controlled means for movement thereby toward or from the valve-seat and guided to move within the said passage, a valve closure on the stem comprising a closure member having a perforated area, below the seat, and having a plurality of perforations and an imperforate head below the same, said perforated member and said stem being capable of relative movement with respect to each other, toward and from the valve-seat and so that the imperforate head approaches more or less said perforated area, covering its perforations more or less; all of said parts cooperating to enable the perforated member to lie seated against the valve-seat when the regulator valve is operating under relatively low velocity of flow, during which the head is moved toward or from the perforated member so that the position of the head relative to the perforated member controls the flow of fluid through the perforations; said perforated closure member operating, when regulating flow at a relatively higher velocity, to lie substantially against the adjacent side of the head and move to and fro in unison with the head, said stem having a shoulder for moving the perforated member off of the seat when a period of relatively high flow velocity operation follows a period of operation at relatively low velocity.

4. In a regulator valve, for regulating the flow of fluid to an appliance consuming the fluid, the combination of a casing having a substantially horizontal fluid passage extending therethrough and having a valve opening for the passage with a valve-seat, through which the fluid flows upwardly, a pressure-chamber located above the fluid passage associated with said casing, pressure controlled means in the pressure-chamber, and having an eduction port leading from the pressure chamber into the fluid passage, and constituting the sole means of communication between the same, a valve stem attached to the pressure-controlled means and guided to move within the said passage, a valve closure on the stem comprising a closure member with a perforated area below the seat, and having a plurality of perforations, and an imperforate head below the same, said perforated member and said stem being capable of relative movement with respect to each other along the axis of the stem to enable the imperforate head to approach more or less closely to the perforated area and restrict more or less, the flow at the perforations; said perforated member being of larger diameter than said head and projecting laterally beyond the periphery of the head; all of said parts cooperating to enable the perforated member to lie seated against the valve-seat when the regulator valve is operating under relatively low velocity of flow during which the pressure-controlled means moves the stem to control the position of the head relative to the perforated area, closing its perforations more or less to control the flow of fluid through the perforations; said perforated closure member operating when regulating flow at a relatively higher velocity, to lie substantially upon the upper side of the head and move to and fro in unison with the head.

5. In a regulator valve, the combination of a casing having a fluid passage therethrough and a valve-seat in the passage, through which the fluid flows upwardly, a pressure-chamber formed in the casing with a wall separating the same from the fluid passage, pressure-controlled means in the pressure-chamber, said wall having an eduction port leading from the pressure chamber into the fluid passage, a valve stem attached to the pressure-controlled means, said wall having a guide opening through which the valve-stem is guided to move within said passage, a valve closure on the stem below the seat, comprising a closure member with a perforated area and having a substantially conical upper face, and an imperforate head below the perforated closure member, said perforated member and said stem being capable of relative movement with respect to each other along the axis of the stem; said perforated member being of larger diameter than said head and projecting laterally beyond the periphery of the head; all of said parts cooperating to hold the perforated member seated against the valve-seat when the regulator valve is operating under relatively low velocity of flow during which the pressure-controlled means moves the stem to control the position of the head relative to the perforated area, and thereby controls the flow of fluid through the perforations; said perforated closure member operating when regulating flow at a relatively higher velocity, to lie substantially upon the upper side of the head and move to and fro in unison with the head.

6. In a regulator valve for regulating the flow of fluid to an appliance consuming the fluid, the combination of a casing having a fluid passage and a valve-seat, through which the fluid flows upwardly, a pressure-chamber associated with said casing, pressure-controlled means therein, a valve stem attached to the pressure-controlled means for movement thereby toward or from the valve-seat, a valve closure on the stem below the valve seat; comprising a closure member with perforations through an area thereof, and located at a point removed from the stem, an imperforate head below the same, said casing having an eduction port therethrough removed from the location of the valve stem and leading from the pressure chamber into the fluid passage, said perforated member being capable of relative movement with respect to the said head toward and from the valve-seat; all of said parts cooperating to enable the perforated member to seat against the valve-seat when the regulator valve is operating under relatively low velocity of flow, during which the position of the head relative to the perforated area is regulated by said pressure-controlled means to maintain the head at more or less distance from the perforations, to regulate and maintain flow of fluid through the perforations to the consumer's appliance; said perforated closure member operating, when regulating flow at a relatively higher velocity, to lie substantially against the adjacent side of the head and move toward and from the seat in unison with the head.

LOUIS C. MORRIS.